US010623286B2

(12) United States Patent
Bhatia et al.

(10) Patent No.: US 10,623,286 B2
(45) Date of Patent: Apr. 14, 2020

(54) ANCHOR MOBILITY IN WIRELESS NETWORKS

(71) Applicants: Randeep S. Bhatia, Green Brook, NJ (US); Fang Hao, Morganville, NJ (US); Tirunell V. Lakshman, Morganville, NJ (US); Harish Viswanathan, Morristown, NJ (US); Colin L. Kahn, Morris Plains, NJ (US)

(72) Inventors: Randeep S. Bhatia, Green Brook, NJ (US); Fang Hao, Morganville, NJ (US); Tirunell V. Lakshman, Morganville, NJ (US); Harish Viswanathan, Morristown, NJ (US); Colin L. Kahn, Morris Plains, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 328 days.

(21) Appl. No.: 15/047,988

(22) Filed: Feb. 19, 2016

(65) Prior Publication Data

US 2017/0244619 A1   Aug. 24, 2017

(51) Int. Cl.
*H04L 12/26* (2006.01)
*H04L 12/927* (2013.01)
(Continued)

(52) U.S. Cl.
CPC .............. *H04L 43/08* (2013.01); *H04L 47/80* (2013.01); *H04L 67/141* (2013.01);
(Continued)

(58) Field of Classification Search
None
See application file for complete search history.

(56) References Cited

U.S. PATENT DOCUMENTS

| 2003/0207688 | A1* | 11/2003 | Nikkelen | H04W 36/0066 455/439 |
| 2014/0043993 | A1* | 2/2014 | Sirotkin | H04W 4/70 370/252 |
| 2016/0037411 | A1* | 2/2016 | Franklin | H04W 36/24 370/331 |

OTHER PUBLICATIONS

Dell, "What is VLAN Routing," Dell PowerConnect Application Note #38, Feb. 2004, downloaded from www.dell.com/downloads/global/products/pwcnt/en/app_note_38.pdf, 5 pages.
(Continued)

*Primary Examiner* — Philip J Chea
*Assistant Examiner* — Hassan A Khan
(74) *Attorney, Agent, or Firm* — Tong, Rea, Bentley & Kim, LLC

(57) ABSTRACT

This disclosure generally discloses an anchor mobility mechanism. The anchor mobility mechanism is configured to support migration of flows between mobility anchors within a wireless communication system. The anchor mobility mechanism may be configured to support migration of flows between mobility anchors within a wireless communication system in a highly seamless manner. The anchor mobility mechanism may be configured to support migration of a flow of a wireless device between mobility anchors within a wireless communication system using functions performed by a control element (CE) and one or more forwarding elements (FEs) within the data plane of the flow of the wireless device. The functions may include identifying a time at which to initiate migration of the flow, initiating migration of the flow based on identification of the time at which to initiate migration of the flow, or the like, as well as various combinations thereof.

25 Claims, 6 Drawing Sheets

(51) Int. Cl.
*H04L 29/08* (2006.01)
*H04W 36/12* (2009.01)
*H04W 88/16* (2009.01)

(52) U.S. Cl.
CPC .......... *H04L 67/143* (2013.01); *H04W 36/12* (2013.01); *H04W 88/16* (2013.01)

(56) References Cited

OTHER PUBLICATIONS

Oracle, "Configuring VLAN Routing," Sun Netra CP3240 Switch User's Guide, Chapter 17, downloaded from www.docs.oracle.com/ce/E19859-01/820-3252-11/FP44ucgVLANRouting.html on Dec. 12, 2016, 7 pages.
IEEE, "IEEE Standard for Local and metropolitan area networks—Bridges and Bridged Networks," IEEE 802.1q-2014, Dec. 19, 2014, pp. 1-1832.
Intel Corporation, "P-GW relocation for SIPTO session continuity," 3GPP Draft TD S2-111783, Apr. 11-15, 2011, Bratislava, Slovakia, 4 pages.
International Search Report and Written Opinion from corresponding PCT Application No. US2017/018065, dated Apr. 12, 2017, 16 pages.
EP Office Action mailed in corresponding EP Application No. 17 708 082.7 dated Feb. 7, 2020, 10 pages.

* cited by examiner

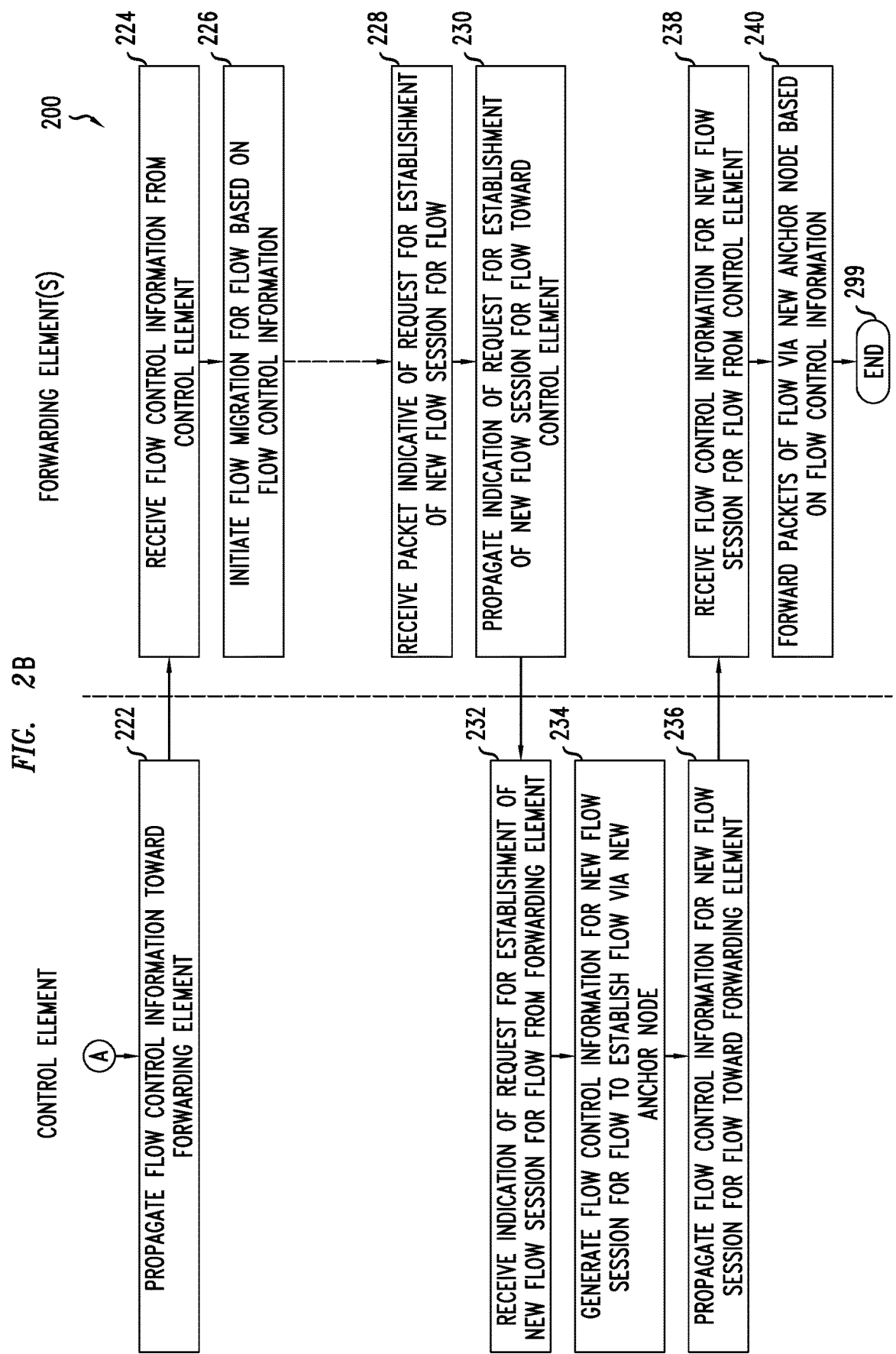

ANCHOR MOBILITY IN WIRELESS NETWORKS

TECHNICAL FIELD

The present disclosure relates generally to the field of communication networks and, more particularly but not exclusively, to anchor mobility in wireless communication networks.

BACKGROUND

Third Generation (3G) and Fourth Generation (4G) wireless networks currently support large numbers of end devices and significant amounts of associated end device traffic. However, with the advent of new types of communication technologies and paradigms, Fifth Generation (5G) wireless networks and beyond are expected to support increasing numbers of end devices and increasing amounts of associated end user traffic. For example, 5G wireless networks are expected to support large numbers of end devices and increases in associated end device traffic as new communication technologies and paradigms, such as the Internet of Things (IoT) and machine-to-machine (M2M) communications, become more ubiquitous. In order to meet the expected growth in end devices and associated end device traffic, 5G wireless networks are expected to move toward a more distributed architecture in which the mobility gateway/anchor nodes are located closer to the edge of the network. As a result of this more distributed architecture, as well as other developments expected in 5G wireless networks, there is expected to be a significant increase in the frequency of mobility events in 5G wireless networks, such as handoffs where the mobility gateway/anchor node changes.

SUMMARY

The present disclosure generally discloses mechanisms supporting anchor mobility in wireless communication networks.

In at least some embodiments, an apparatus includes a processor and a memory communicatively connected to the processor. The processor is configured to detect, by a control element, an anchor migration condition indicative that a flow of a wireless device is to be migrated from a first anchor node to a second anchor node. The processor is configured to propagate, from the control element toward a forwarding element on a data path of the flow based on the anchor migration condition, flow control information configured to cause the forwarding element to monitor the flow for identifying a time at which to initiate migration of the flow. The processor is configured to receive, at the control element from the forwarding element based on monitoring of the flow by the forwarding element, an indication that the time at which to initiate migration of the flow has been identified.

In at least some embodiments, a method includes detecting, by a control element, an anchor migration condition indicative that a flow of a wireless device is to be migrated from a first anchor node to a second anchor node, propagating, from the control element toward a forwarding element on a data path of the flow based on the anchor migration condition, flow control information configured to cause the forwarding element to monitor the flow for identifying a time at which to initiate migration of the flow, and receiving, at the control element from the forwarding element based on monitoring of the flow by the forwarding element, an indication that the time at which to initiate migration of the flow has been identified.

In at least some embodiments, an apparatus includes a processor and a memory communicatively connected to the processor. The processor is configured to receive, by a forwarding element on a data path of a flow of a wireless device to be migrated from a first anchor node to a second anchor node, flow control information configured to cause the forwarding element to monitor the flow for identifying a time at which to initiate migration of the flow. The processor is configured to monitor the flow, by the forwarding element based on the flow control information, to identify the time at which to initiate migration of the flow. The processor is configured to propagate, from the forwarding element toward a control element, an indication that the time at which to initiate migration of the flow has been identified.

In at least some embodiments, a method includes receiving, by a forwarding element on a data path of a flow of a wireless device to be migrated from a first anchor node to a second anchor node, flow control information configured to cause the forwarding element to monitor the flow for identifying a time at which to initiate migration of the flow, monitoring the flow, by the forwarding element based on the flow control information, to identify the time at which to initiate migration of the flow, and propagating, from the forwarding element toward a control element, an indication that the time at which to initiate migration of the flow has been identified.

BRIEF DESCRIPTION OF THE DRAWINGS

The teachings herein can be readily understood by considering the following detailed description in conjunction with the accompanying drawings, in which:

FIGS. 2A and 2B depict a flow diagram of a method for providing anchor mobility;

To facilitate understanding, identical reference numerals have been used, where possible, to designate identical elements that are common to the figures.

DETAILED DESCRIPTION

This disclosure generally discloses an anchor mobility mechanism. The anchor mobility mechanism is configured to support migration of flows between mobility anchors within a wireless communication system. The anchor mobility mechanism may be configured to support migration of flows between mobility anchors within a wireless communication system in a highly seamless manner. The anchor mobility mechanism may be configured to support migration of a flow of a wireless device between mobility anchors within a wireless communication system using functions performed by a control element (CE) and functions performed by one or more forwarding elements (FEs) within the data plane of the flow of the wireless device. The CE and one or more FEs may cooperate to provide the various functions for supporting migration of the flow of the wireless device between the mobility anchors within the wireless communication system. The functions may include identifying a time at which to initiate migration of the flow, initiating migration of the flow based on identification of the time at which to initiate migration of the flow, or the like, as well as various combinations thereof. These and various other embodiments and potential advantages of the anchor mobility mechanism may be further understood by way of reference to an exemplary software defined networking (SDN)-based 5G wireless system as depicted in FIG. 1.

Figure 1:
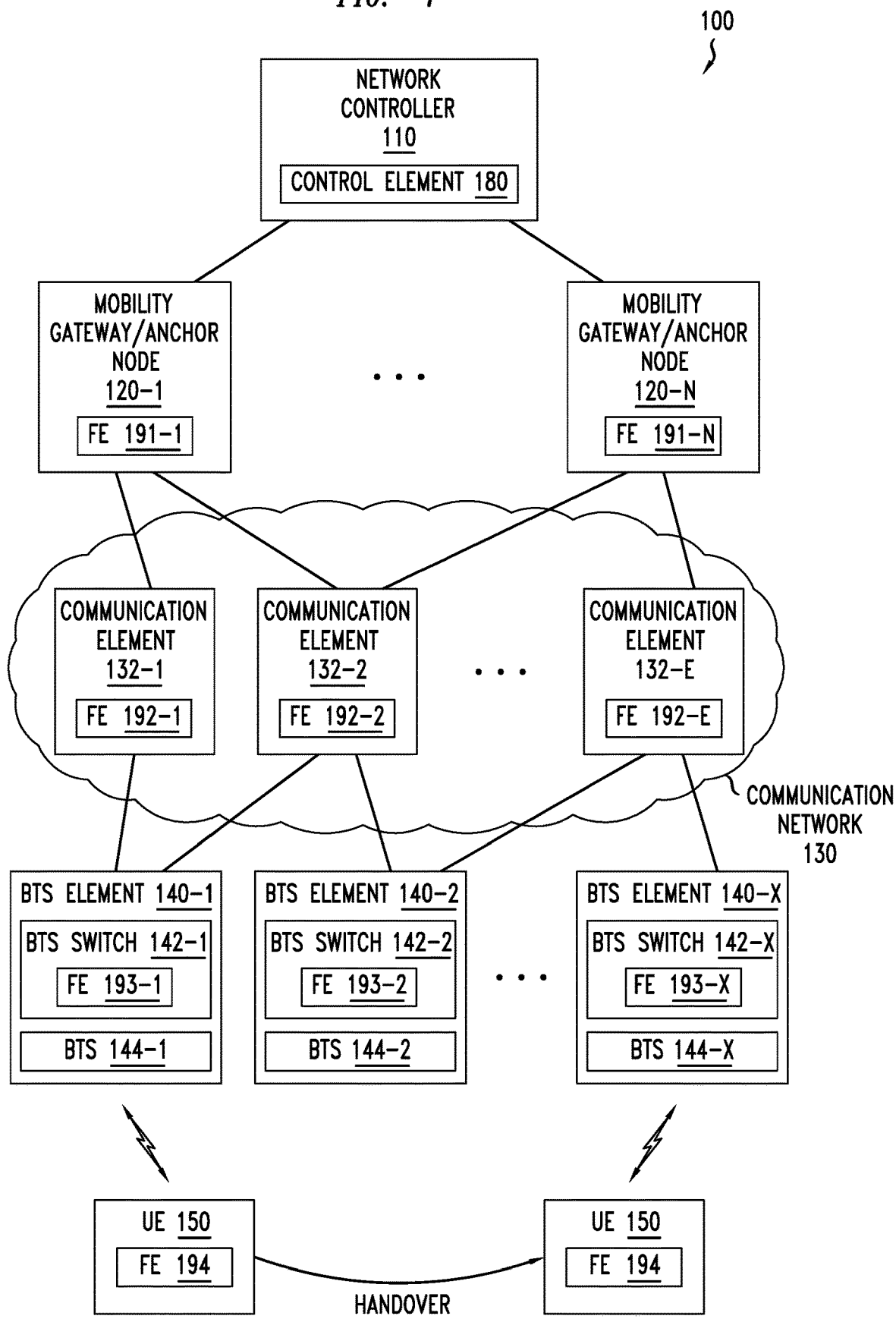
FIG. 1 depicts an SDN-based 5G wireless system configured to support anchor mobility.

FIG. 1 depicts an SDN-based 5G wireless system configured to support anchor mobility.

As depicted in FIG. 1, the SDN-based 5G wireless system 100 includes a network controller (NC) 110, a set of mobility gateway/anchor (MGA) nodes 120-1-120-N (collectively, MGA nodes 120), a communication network (CN) 130, a set of base transceiver station (BTS) elements 140-1-140-X (collectively, BTS elements 140), and a User Equipment (UE) 150. The NC 110 is communicatively connected to the MGA nodes 120 (although it will be appreciated that the NC 110 alternatively or also may be communicatively connected to various other elements of the SDN-based 5G wireless system 100. The CN 130 includes a set of communication elements 132-1-132-E (collectively, communication elements 132). The BTS elements 140-1-140-X include BTS switches 142-1-142-X and BTSs 144-1-144-X, respectively.

The MGA nodes 120 each are communicatively connected to one or more of the communication elements 132 of CN 130 and the BTS elements 140 each are communicatively connected to one or more of the communication elements 132 of CN 130, such that CN 130 provides backhaul between various combinations of MGA nodes 120 and BTS elements 140. The UE 150 may obtain network access via any of the BTSs 144 of any of the BTS elements 140 (illustratively, UE 150 is initially connected to BTS 144-1 and communicating a data flow via MGA node 120-1 and then migrates to being connected to BTS 144-X and communicating the data flow via MGA node 120-N, where this anchor migration is discussed in further detail below).

The NC 110 may be configured to support various network control functions within the SDN-based 5G wireless system 100. The NC 110 may be configured to support various control functions for controlling the operation of various elements within the SDN-based 5G wireless system 100. The NC 110 may include various functions and capabilities of various elements of 4G wireless networks (e.g., Mobility Management Entities (MMEs), Policy and Charging Rules Functions (PCRFs), Access Network Discover and Selection Functions (ANDSFs), control plane portions of Serving Gateways (SGWs) and Packet Data Network (PDN) Gateways (PGWs, or the like, as well as various combinations thereof), additional functions and capabilities of specific for 5G, or the like, as well as various combinations thereof. For example, the NC 110 may be configured to support anchor selection and assignment functions, route selection functions, mobility management functions (e.g., handoffs between BTS elements 140, anchor mobility between MGA nodes 120, or the like), Service Level Agreement (SLA) enforcement, network access functions (e.g., single network access, multi-connectivity including flexible multiple—Radio Access Technology (RAT) control, or the like), network service and application control functions, service chaining functions, and various other functions and capabilities. The NC 110, as discussed herein, may be configured to support anchor mobility (e.g., per-UE anchor mobility, per-flow anchor mobility, or the like). The NC 110 may be configured to support various other functions and capabilities.

The MGA nodes 120 may be configured to provide various mobility gateway/anchor functions for UEs 150. The MGA nodes 120 may be configured to operate as gateways to other communication networks (e.g., packet data networks such as public packet data networks (e.g., the Internet), private packet data networks (e.g., datacenter networks, enterprise networks, or other types of private packet data networks), or the like), which are omitted from FIG. 1 for purposes of clarity. The MGA nodes 120 may be configured to operate as anchor nodes for the UEs 150 (e.g., assigning Internet Protocol (IP) addresses for use by flows of the UEs 150 and providing other related anchor node functions for UEs 150). For example, the MGA nodes 120 may be 5G switches/routers (e.g., supporting at least some functions typically supported by a 4G LTE PGW or PGW/SGW combination, supporting new 5G functions, or the like, as well as various combinations thereof). The MGA nodes 120 may be configured to support anchor mobility (e.g., per-UE anchor mobility, per-flow anchor mobility, or the like). The MGA nodes 120 may be configured to support various other functions and capabilities.

The CN 130 may be configured to support communications between various elements of SDN-based 5G wireless system 100. The CN 130 may be configured to support data plane communications between the MGA nodes 120 and the BTS elements 140, thereby supporting communications between the UEs 150 and the MGA nodes 120 (and, therefore, various other devices accessible to the UEs 150 via the MGA nodes 120). The CN 130 may be configured to support control plane communications between the NC 110 various other elements (e.g., the BTS elements 140, the UEs 150, or the like), control plane communications between MGA nodes 120 and various other elements (e.g., the BTS elements 140, the UEs 150, or the like), or the like, as well as various combinations thereof. For example, CN 130 may include all or part of a wireless core network, may include a portion of a radio access network (e.g., backhaul between the wireless access points (illustratively, BTS elements 140) and the wireless core network), or the like, as well as various combinations thereof. The communication elements 132 may include any elements suitable for supporting control and data plane traffic. For example, the communication elements 132 may include routers, switches (e.g., Layer 2 (L2) switches, Layer 3 (L3) switches, L2/L3 switches, or the like), or the like, as well as various combinations thereof.

The BTS elements 140 are configured to operate as wireless points of access for the UEs 150 (illustratively, the BTSs 144 of the BTS elements 140) and to support communications with CN 130 (illustratively, the BTS switches 142 of the BTS elements 140). The BTS switches 142 may be configured to support various switching functions suitable for supporting communications between BTSs 144 and CN 130 and, thus, between UEs 150 and MGA nodes 120. The BTSs 144 may be configured to support various wireless access capabilities for providing radio interfaces for the UEs 150. The BTS elements 140 (e.g., BTS switches 142) may be configured to support per-flow anchor mobility support anchor mobility (e.g., per-UE anchor mobility, per-flow anchor mobility, or the like). The BTS elements 140 may be configured to support various other functions and capabilities.

The UEs 150 include wireless devices configured to wirelessly access and communicate via BTS elements 140. For example, the UEs 150 may include end user devices (e.g., smartphones, tablet computers, laptop computers, or the like). For example, the UEs 150 may include Internet-of-Things (IoT) devices (e.g., sensors, monitors, actuators, controllers, or the like) which may be deployed for various IoT applications. For example, IoT applications may include consumer applications (e.g., health and fitness applications, gaming, or the like), smart home applications (e.g., controlling lighting, temperature, appliances, communication systems, security devices, entertainment device, or the like), environmental monitoring applications (e.g., assisting in environmental protection, monitoring the movements of wildlife, providing monitoring for earthquake and tsunami early warning systems, or the like), infrastructure management applications (e.g., monitoring urban and rural infrastructure), energy management applications (e.g., monitoring and controlling smart-grid technology and other types of energy management applications), manufacturing applications (e.g., providing automated controls, plant optimization, health and safety management, or the like), commercial building automation applications (e.g., controlling lighting, temperature, appliances, communication systems, security devices, or the like), healthcare applications (e.g., wearable medical devices for patient tracking, health monitoring or the like), or the like. The UEs 150 may include various other types of wireless devices which may wirelessly access and communicate via BTS elements 140.

It will be appreciated that, although primarily depicted and described with respect to use of specific types, numbers, and arrangements of elements within the SDN-based 5G wireless system 100, the SDN-based 5G wireless system 100 may include various other types, numbers, and arrangement of elements. For example, the SDN-based 5G wireless system 100 may include one or more additional NCs 110, fewer or more MGA nodes 120, fewer or more communication elements 132, fewer or more BTS elements 140, fewer or more UEs 150, various other arrangements of such elements, or the like, as well as various combinations thereof.

As depicted in FIG. 1, the SDN-based 5G wireless system 100 is configured to use SDN. In general, the use of SDN and Network Function Virtualization (NFV) concepts in datacenters, wide area networks (WANs), and access networks is expected to have fundamental implications on 5G standards, protocols, and products. SDN is expected to extend all the way from the datacenter and WAN deep into the mobile network (and potentially to the end devices). With SDN, separation of the control and data planes allows for flexible control, configuration, and provisioning of non-specialized, off the shelf forwarding elements (FE) via a logically-centralized control element (CE) using standard protocols. This is depicted in FIG. 1 as a control element (CE) 180 provided on NC 110 that is configured to control FEs provided on various elements within the SDN-based 5G wireless system 100. As depicted in FIG. 1, FEs are provided on each of the MGA nodes 120-1-120-N (illustratively, as FEs 191-1-191-N, respectively), on each of the communication elements 132-1-132-E of CN 130 (illustratively, as FEs 192-1-192-E, respectively), on each of the BTS switches 142-1-142-X (illustratively, as FEs 193-1-193-X, respectively), and on each of the UEs 150 (illustratively, as FEs 194, respectively). The FEs may be configured to operate as switches and, thus, also may be referred to herein as switches. In 5G wireless networks, given the increased use of FEs, it is expected that the CE 180 may need to support large numbers of FEs (e.g., potentially on the order of hundreds of millions of FEs in at least some 5G wireless networks). It will be appreciated that, although primarily depicted and described with respect to use of specific numbers and arrangements of FEs within the SDN-based 5G wireless system 100, FEs may be deployed within the SDN-based 5G wireless system 100 in various other ways (e.g., using additional FEs on other types of elements, excluding FEs from some or all of UEs 150, or the like, as well as various combinations thereof).

The CE 180 may be configured to support various SDN-related functions which enable the NC 110 to provide the various functions supported by the NC 110. For example, the CE 180 of NC 110 may be configured to support various SDN control plane functions, such as supporting management of flow table entries on the FEs, such as computing flow table entries for FEs, sending flow table entries to FEs, controlling removal of flow table entries from FEs, or the like, as well as various combinations thereof. For example, the CE 180 of NC 110 may be configured to program flow table entries of FEs for setting up user plane tunnels, controlling user plane functions such as charging, activating per-flow QoS, establishing/maintaining IP connectivity with anchors and select network accesses for forwarding flow packets under multi-connectivity, modifying user plane tunnels, tearing down user plane tunnels, or the like, as well as various combinations thereof. The CE 180 may be configured to provide various functions supporting anchor mobility (e.g., per-UE anchor mobility, per-flow anchor mobility, or the like). The CE 180 may be configured to support various other functions.

The FEs also may be configured to support various SDN-related functions which enable the elements within which the FEs are provided to provide the various functions supported by the element within which the FEs are supported. For example, FEs may be configured to support SDN control plane functions to enable control plane communications between the FEs and CE 180 (e.g., forwarding new flow requests to the CE 180 so that the CE 180 can generate new flow table entries for the new flow requests and receiving and installing the new flow table entries from the CE 180, receiving flow table entry modification instructions from the CE 180 and updating the flow table entries based on the flow table entry modification instructions, receiving flow table entry deletion instructions from the CE 180 and deleting the flow table entries, or the like). For example, FEs may be configured to support SDN data plane functions to enable data plane communications associated with UEs 150. The FEs may be configured to provide various functions supporting anchor mobility (e.g., per-UE anchor mobility, per-flow anchor mobility, or the like). The FEs may be configured to support various other functions.

As discussed herein, there is expected to be a significant increase in the frequency of mobility events, such as handoffs where the mobility gateway/anchor node changes, in 5G wireless networks such as the SDN-based 5G wireless system 100 depicted in FIG. 1. For example, in order to meet the expected growth in end devices and associated end device traffic in 5G wireless networks (e.g., 5G wireless networks are expected to support large numbers of end devices and increases in associated end device traffic as new communication technologies and paradigms, such as IoT and M2M communications, become more ubiquitous), 5G wireless networks are expected to move toward a more distributed architecture in which the mobility gateway/anchor nodes (e.g., MGA nodes 120) are located closer to the edge of the network and, thus, the frequency of mobility events increases. For example, 5G wireless networks are expected to support various features which may result in increases in mobility events, such as optimized dynamic per-flow anchor assignment (and re-assignment) to individual application flows based on various inputs (e.g., application specific requirements, network wide load balancing, UE location information, or the like, as well as various combinations thereof). Accordingly, given the expected significant increase in the frequency of mobility events in 5G networks, various anchor mobility mechanisms may be utilized to support migration of flows between mobility anchors within a wireless communication system in a highly seamless manner tending to reduce or minimize disruptions (e.g., packet loss, migration time, or the like) during migration and, thus, reducing or minimizing the impact of migration on network performance and subscriber experience.

As discussed herein, various anchor mobility mechanisms may be utilized to support migration of flows between mobility anchors within a wireless communication system in a highly seamless manner tending to reduce or minimize disruptions. Typically, in the absence of the anchor mobility mechanism discussed herein, anchor migration results in a disruption to the underlying flow connection (e.g., a Transmission Control Protocol (TCP) connection or other suitable type of transport connection) supporting the flow and, thus, to the data of the data flow transported via the flow connection. This is due to the fact that an anchor migration also results in a change in the IP address that is assigned to the UE 150 (and, thus, being used by the application on the UE 150). As a result, the application on the UE 150 must establish a new flow connection (e.g. a TCP connection or other suitable type of transport connection) with the server after anchor migration and must then resume the data flow from a point prior to the anchor migration. Accordingly, the following may be used in order to minimize disruptions during anchor migration: (1) perform the anchor migration at a time when there is little or no activity on the flow session and (2) coordinate the tear-down and reestablishment of the flow session for the data flow in a manner tending to reduce or minimize packet loss and in a manner tending to reduce or minimize migration delay.

As discussed herein, SDN-based 5G wireless system 100 is configured to provide an anchor migration mechanism that is configured to support the migration of a flow of a UE (illustratively, UE 150) between mobility anchors (illustratively, MGA nodes 120) in a highly seamless manner tending to reduce or minimize disruptions. The flow that is migrated may be any suitable type of application layer flow (e.g., a Hypertext Transfer Protocol (HTTP) flow, a Real-Time Transport Protocol (RTP) flow, a Real Time Streaming Protocol (RTSP) flow, or the like). The migration of a flow from an existing anchor (existing MGA node 120) to a new anchor (new MGA node 120) may be performed by identifying a time at which to initiate the migration of the flow and initiating the migration of the flow based on identification of the time at which to initiate the migration of the flow. The initiation of the migration of the flow may include initiating termination of an underlying connection supporting the flow (e.g., an underlying transport layer connection, such as a TCP connection, or other suitable type of underlying flow connection) such that, when reestablished, the underlying connection is reestablished via the new anchor node rather than via the existing anchor node. As discussed further below, these and various other functions associated with anchor migration may be controlled by CE 180 (or, more generally, the NC 110) and supported by various FEs under the control of the CE 180.

The CE 180 may be configured to perform anchor node tracking and selection functions for the UE 150. The CE 180 may be configured to track the set of anchor nodes (illustratively, MGA nodes 120) with which UE 150 is associated. The CE 180 may be configured to track the set of anchor nodes with which UE 150 is associated by updating the set of anchor nodes with which UE 150 is associated based on detection of an event (e.g., an indication of mobility of the UE 150 between BTS elements 140, an expiration of a timer, or the like). It will be appreciated that, depending on which BTS element 140 with which the UE 150 is associated, the UE 150 may have available one or more MGA nodes 120 which may operate as anchors for the UE 150. For example, when associated with BTS element 140-1, UE 150 may be associated with MGA node 120-1 via communication element 132-1 or may be associated with MGA node 120-N via communication element 132-2. The CE 180 may be configured to select the anchor node(s) to be used by the UE 150 (e.g., on a per-UE basis such that all flows of the UE 150 traverse the same anchor node, on a per-flow basis such that different flows of the UE 150 may traverse different anchor nodes, or the like). The CE 180 may be configured to inform the UE 150 of the anchor node(s) assigned by the CE 180 for the UE 150, such that the UE 150 may obtain the IP address(es) from the anchor node(s). It will be appreciated that such functions may be used for determining which of the anchor nodes is to be used when migration of a flow between anchor nodes is to be performed, as discussed further below.

The CE 180 may be configured to control identification of the time at which to initiate the migration of the flow. The time at which to initiate the migration of the flow may be identified based on monitoring of the state of the flow. The state of the flow may be monitored to identify an optimal or near optimal time at which to initiate the migration of the flow. The monitoring of the state of the flow may be performed at one of the FEs along the data path of the flow (e.g., the FE 194 of the UE 150, the FE 193 of the BTS switch 142 supporting the UE 150, the FE 192 of the communication element 132 supporting the flow, the FE 191 of the MGA node 120 supporting the flow, or any other suitable FE along the flow path). The CE 180 may configure an FE along the data path of the flow to monitor the state of the flow by provisioning within the FE a flow table entry configured for enabling the FE to monitor the state of the flow for a condition associated with identification of a time at which the flow is to be migrated. The FE may then monitor the state of the flow based on the flow table entry provisioned by the CE 180 and, based on a determination that the condition specified by the flow table entry has been identified, reports identification of the condition to the CE 180 such that the CE 180 may then initiate the migration process for migrating the flow. The time at which to initiate the migration of the flow may be a time at which there is no activity or little activity (e.g., activity that is below a threshold level of activity, such as in terms of the number of packets communicated, the amount of data communicated, or the like) on the flow, and the state of the flow may be monitored to identify a time of no activity or little activity on the flow. For example, the CE 180 may configure an FE along the data path of the flow to monitor the activity level of the flow by provisioning within the FE a flow table entry configured to timeout if there is no activity on the data plane for the flow for a set period of time, the FE may then monitor the activity level of the flow based on the flow table entry provisioned by the CE 180 and, based on detection of the timeout condition, send an indication of the timeout condition to the CE 180, and the CE 180 may then initiate the migration process in response to the indication of the timeout condition. It will be appreciated that other activity monitoring mechanisms of FEs along the data path of the flow may be utilized to identify the time at which to initiate the migration of the flow. It is noted that, although primarily described with respect to embodiments in which the time at which to initiate the migration of the flow is a time of no activity or little activity on the flow, one or more other conditions also or alternatively may be used as a basis for identifying the time at which to initiate the migration of the flow. It will be appreciated that the condition(s) used as a basis for identifying the time at which to initiate migration of the flow may be different for different applications (an example of which is discussed further below for HTTP flows). It will be appreciated that other mechanisms of FEs along the data path of the flow may be utilized to identify the time at which to initiate the migration of the flow.

The CE 180 may be configured to control the migration of the flow based on identification of the time at which to initiate the migration of the flow. The CE 180 may be configured to control the migration of the flow by controlling one of the FEs along the data path of the flow (e.g., the FE 194 of the UE 150, the FE 193 of the BTS switch 142 supporting the UE 150, the FE 192 of the communication element 132 supporting the flow, the FE 191 of the MGA node 120 supporting the flow, or any other suitable FE along the flow path) to trigger termination of the existing flow session (e.g., existing TCP connection) that is using the existing MGA node 120 and establishment of a new flow session (e.g., new TCP connection) that is using a new MGA node 120 or by directly triggering termination of the existing flow session (e.g., existing TCP connection) that is using the existing MGA node 120 and establishment of a new flow session (e.g., new TCP connection) that is using a new MGA node 120.

The CE 180, as noted above, may be configured to control the migration by configuring one of the FEs along the data path of the flow (e.g., the FE 194 of the UE 150, the FE 193 of the BTS switch 142 supporting the UE 150, the FE 192 of the communication element 132 supporting the flow, the FE 191 of the MGA node 120 supporting the flow, or any other suitable FE along the flow path) to trigger termination of the existing flow session (e.g., existing TCP connection) that is using the existing MGA node 120 and establishment of a new flow session (e.g., new TCP connection) that is using a new MGA node 120, thereby effecting a migration of the flow between the anchors for the flow of the UE 150. The configuration of the FE to trigger the termination of the existing flow session and the establishment of the new flow session may be performed by configuring the FE to notify the endpoints of the existing flow session (namely, the UE 150 and an associated server or other device with which the UE 150 is communicating) to terminate the existing flow session. The CE 180 may configure the FE to notify the endpoints of the existing flow session to terminate the existing flow session by provisioning within the FE a flow table entry that is configured to cause a session termination notification to be sent to at least one of the UE 150 or the endpoint with which the UE 150 is communicating. The session termination notification sent by the FE may be a newly generated packet, a modified version of a packet of the flow (e.g., such as where the FE provides a packet of the flow responsive to detection of the event and the CE 180 modifies the packet such that the modified packet is configured to trigger termination of the flow), a control message, or the like, as well as various combinations thereof.

The CE 180, as noted above, may be configured to control the migration of the flow by configuring one of the FEs along the data path of the flow (e.g., the FE 194 of the UE 150, the FE 193 of the BTS switch 142 supporting the UE 150, the FE 192 of the communication element 132 supporting the flow, the FE 191 of the MGA node 120 supporting the flow, or any other suitable FE along the flow path) to monitor for an event which, when detected by the FE and reported by the FE to the CE 180, causes the CE 180 to trigger termination of the existing flow session (e.g., existing TCP connection) that is using the existing MGA node 120 and establishment of a new flow session (e.g., new TCP connection) that is using a new MGA node 120, thereby effecting a migration of the flow between the anchors for the flow of the UE 150. The event may be expiration of a timer, receipt of a packet of the flow, or the like. The configuration of the FE to monitor for and report the detection of the event may be performed by configuring the FE to monitor for the event and to notify the CE 180 when the event is detected (e.g., by sending a control message, by forwarding a received packet of the flow to the CE 180, or the like, as well as various combinations thereof). The CE 180 may configure the FE to monitor for and report the event by provisioning within the FE a flow table entry that is configured to cause the FE to monitor for the event and to provide instructions to the FE as to the manner in which detection of the event is to be reported to the CE 180. The CE 180 may be configured to notify the endpoints of the existing flow session to terminate the existing flow session responsive to reporting of detection of the event by the FE. The CE 180 may be configured to notify the endpoints of the existing flow session to terminate the existing flow session by sending a session termination notification to at least one of the UE 150 or the endpoint with which the UE 150 is communicating (as opposed to configuring a flow table entry on the one of the FEs to cause the FE to send the session termination notification to one of the endpoints). The session termination notification sent by the CE 180 may be a newly generated packet, a modified version of a packet of the flow (e.g., such as where the FE provides a packet of the flow responsive to detection of the event and the CE 180 modifies the packet such that the modified packet is configured to trigger termination of the flow), a control message, or the like, as well as various combinations thereof. The session termination notification may be sent by the CE 180 via the associated FE.

The termination of the existing flow session and establishment of the new flow session, as discussed above, may be performed by the FE under the control of CE 180 or may be performed by the CE 180 with assistance of the FE. The termination of the existing flow session and establishment of the new flow session may be performed by the FE or CE 180 on behalf of the UE 150 (e.g., the FE or CE 180 is configured to send the session termination notification to the endpoint with which the UE 150 is communicating) or on behalf of the endpoint with which the UE 150 is communicating (e.g., the FE or CE 180 is configured to send the session termination notification to the UE 150), both of which are discussed below.

The termination of the existing flow session and establishment of the new flow session, as noted above, may be performed by the FE on behalf of the UE 150. In this case, the CE 180 provisions within the FE a flow table entry that is configured to cause the session termination notification to be sent to the endpoint with which the UE 150 is communicating. The manner in which the session termination notification is sent may depend on whether or not there is any data activity on the existing flow session. For example, in the case in which there is data activity on the existing flow session, the FE, based on the flow table entry, may provide the notification to the endpoint with which the UE 150 is communicating by modifying a packet of the data flow to indicate that the existing flow session is being terminated (e.g., by setting a TCP FIN flag in the packet (e.g., setting the TCP FIN flag bit to "1"), setting a TCP RESET flag in the packet (e.g., setting the TCP RESET flag bit to "1"), or using another suitable indicator) and sending the modified packet to the endpoint with which the UE 150 is communicating. For example, in the case in which there is no data activity on the existing flow session, the FE, based on the flow table entry, may provide the notification to the endpoint with which the UE 150 is communicating by generating a packet that includes an indication that the existing flow session is being terminated (e.g., by creating a TCP FIN packet on behalf of the application (with appropriately set addresses and sequence numbers), by creating a TCP RESET packet on behalf of the application (with appropriately set addresses and sequence numbers), or the like) and sending the generated packet to the endpoint with which UE 150 is communicating. It will be appreciated that the session termination notification that is sent to the endpoint with which the UE 150 is communicating will cause the endpoint to stop sending packets via the existing flow session. It is noted that the flow table entry on the FE also may be configured to cause the FE to drop any subsequent packets received from the application for the data flow. The endpoint with which the UE 150 is communicating, upon receiving the session termination notification (e.g., packet with a TCP FIN flag, packet with a TCP RESET flag, or the like), initiates a teardown of the existing flow session on its side and responds with a session termination acknowledgment (e.g., a TCP FIN packet, a TCP RESET packet, or the like) that is then propagated back to the UE 150. It is noted that any flow packets being sent from the endpoint with which the UE 150 is communicating to the UE 150 (including the session termination acknowledgment) continue to be passed to the application on the UE 150. The application on the UE 150, based on receipt of the session termination acknowledgement from the endpoint with which the UE 150 is communicating, initiates a teardown of the existing flow session on its side. As a result, the flow table entry provisioned on the FE by the CE 180 has caused both ends of the existing flow session to be notified that the existing flow session is to be terminated. It is noted that, at this point, the flow is still anchored on the existing anchor. The application on the UE 150, responsive to termination of the existing flow session, initiates a reconnection with the endpoint with which the UE 150 was previously communicating. The application on the UE 150 initiates reconnection with the endpoint with which the UE 150 was previously communicating by sending a session establishment request (e.g., a TCP SYN packet) directed to the endpoint with which the UE 150 was previously communicating. The FE, upon receiving the session establishment request, notifies the CE 180 of the session establishment request. The CE 180, based on receipt of the session establishment request from the FE, configures the FE with a flow table entry indicative that packets for the application of the UE 150 are to be forwarded via the new anchor. As a result, the new flow session that is established between the UE 150 and the endpoint with which the UE 150 was previously communicating is established via the new anchor and, thus, the data flow has been migrated from the existing anchor to the new anchor and proceeds via the new anchor. It will be appreciated that, although primarily described with respect to use of a single FE to perform the various FE functions for effecting an anchor migration, the various FE functions for effecting an anchor migration may be distributed across multiple FEs (e.g., using an FE 193 on a BTS switch 142 to monitor for activity in order to identify the time at which to initiate the migration, using an FE 191 on the existing MGA node 120 to notify the endpoints of the flow session termination, using an FE 194 on the UE 150 to handle the session reestablishment request, and so forth). It will be appreciated that, although primarily described above with respect to embodiments in which the termination of the existing flow session and establishment of the new flow session is performed by the FE on behalf of the UE 150, in at least some embodiments the termination of the existing flow session and establishment of the new flow session may be performed by the CE 180 on behalf of the UE 150 (e.g., by modifying an existing packet of the flow received from the FE (e.g., to include a TCP FIN flag, a TCP RESET flag, or any other suitable indicator) and sending the modified packet toward the UE 150, by generating a new packet for the flow (e.g., a TCP packet with a TCP FIN flag set, a TCP packet with a TCP RESET flag set, or the like) and sending the generated packet toward the UE 150, or the like).

The termination of the existing flow session and establishment of the new flow session, as noted above, may be performed by the FE on behalf of endpoint with which the UE 150 is communicating. In this case, the CE 180 provisions within the FE a flow table entry that is configured to cause the session termination notification to be sent to the application on the UE 150. The manner in which the session termination notification is sent may depend on whether or not there is any data activity on the existing flow session. For example, in the case in which there is data activity on the existing flow session, the FE, based on the flow table entry, may provide the notification to the application on the UE 150 by modifying a packet of the data flow (received from the endpoint with which the UE 150 is communicating) to indicate that the existing flow session is being terminated (e.g., by setting a TCP FIN flag in the packet, setting a TCP RESET flag in the packet, or using another suitable indicator) and sending the modified packet to the application on the UE 150. For example, in the case in which there is no data activity on the existing flow session, the FE, based on the flow table entry, may provide the notification to the application on the UE 150 by generating a packet that includes an indication that the existing flow session is being terminated (e.g., by creating a TCP FIN packet on behalf of the application (with appropriately set addresses and sequence numbers), by creating a TCP RESET packet on behalf of the application (with appropriately set addresses and sequence numbers), or the like) and sending the generated packet to the application on the UE 150. It will be appreciated that the session termination notification that is sent to application on the UE 150 will cause the application to stop sending packets via the existing flow session. It is noted that the flow table entry on the FE also may be configured to cause the FE to drop any subsequent packets received from the application for the data flow. The application on the UE 150, upon receiving the session termination notification (e.g., packet with a TCP FIN flag, packet with a TCP RESET flag, or the like), initiates a teardown of the existing flow session on its side and responds with a session termination acknowledgment (e.g., a TCP FIN packet, a TCP RESET packet, or the like) that is then propagated back to the endpoint with which the UE 150 is communicating. It is noted that any flow packets being sent from the application on the UE 150 to the endpoint with which the UE 150 is communicating (including the session termination acknowledgment) continue to be passed to the endpoint with which the UE 150 is communicating. The endpoint with which UE 150 is communicating, based on receipt of the session termination acknowledgement from the application on the UE 150, initiates a teardown of the existing flow session on its side. As a result, the flow table entry provisioned on the FE by the CE 180 has caused both ends of the existing flow session to be notified that the existing flow session is to be terminated. It is noted that, at this point, the flow is still anchored on the existing anchor. The application on the UE 150, responsive to termination of the existing flow session, initiates a reconnection with the endpoint with which the UE 150 was previously communicating. The application on the UE 150 initiates reconnection with the endpoint with which the UE 150 was previously communicating by sending a session establishment request (e.g., a TCP SYN packet) directed to the endpoint with which the UE 150 was previously communicating. The FE, upon receiving the session establishment request, notifies the CE 180 of the session establishment request. The CE 180, based on receipt of the session establishment request from the FE, configures the FE with a flow table entry indicative that packets for the application of the UE 150 are to be forwarded via the new anchor. As a result, the new flow session that is established between the UE 150 and the endpoint with which the UE 150 was previously communicating is established via the new anchor and, thus, the data flow has been migrated from the existing anchor to the new anchor and proceeds via the new anchor. It will be appreciated that, although primarily described with respect to use of a single FE to perform the various FE functions for effecting an anchor migration, the various FE functions for effecting an anchor migration may be distributed across multiple FEs (e.g., using an FE 191 on the existing MGA node 120 to monitor for activity in order to identify the time at which to initiate the migration, using an FE 193 on the existing BTS switch 142 to notify the endpoints of the flow session termination, using an FE 194 on the UE 150 to handle the session reestablishment request, and so forth). It will be appreciated that, although primarily described above with respect to embodiments in which the termination of the existing flow session and establishment of the new flow session is performed by the FE on behalf of endpoint with which the UE 150 is communicating, in at least some embodiments the termination of the existing flow session and establishment of the new flow session may be performed by the CE 180 on behalf of endpoint with which the UE 150 is communicating (e.g., by modifying an existing packet of the flow received from the FE (e.g., to include a TCP FIN flag, a TCP RESET flag, or any other suitable indicator) and sending the modified packet toward the endpoint with which the UE 150 is communicating, by generating a new packet for the flow (e.g., a TCP packet with a TCP FIN flag set, a TCP packet with a TCP RESET flag set, or the like) and sending the generated packet toward the endpoint with which the UE 150 is communicating, or the like).

The termination of the existing flow session and establishment of the new flow session, as noted above, may be performed by the FE or CE 180 on behalf of the UE 150 (e.g., via communication by the FE with the UE 150 or via communication by the CE 180 with the UE 150 where the CE 180 generates the TCP FIN packet or TCP RESET packet that is provided to the UE 150) or may be performed by the FE or CE 180 on behalf of endpoint with which the UE 150 is communicating (e.g., via communication by the FE with endpoint with which the UE 150 is communicating or via communication by the CE 180 with the endpoint with which the UE 150 is communicating where the CE 180 generates the TCP FIN packet or TCP RESET packet that is provided to the endpoint with which the UE 150 is communicating). The CE 180 may be configured to determine which side of the existing flow session is selected for teardown. The CE 180 may be configured to determine which side of the existing flow session is selected for teardown based on various types of information (e.g., depending on which side of the existing flow session has more activity, depending on which side of the existing flow session is more important, or the like, as well as various combinations thereof). It is noted that proper selection of the side of the existing flow session that is selected for teardown may further reduce the impact of the disruption experienced during the flow migration.

It will be appreciated that, when the anchor migration mechanism is used, the time required to tear down the existing flow session during the flow migration is only one round trip time (RTT), which includes the time it takes for the session termination notification message to be propagated to the endpoint at the side of the existing flow session that is selected for teardown and the time it takes for the corresponding session termination acknowledgement to be propagated back to the other endpoint in the other direction. By contrast, in the absence of the anchor migration mechanism, termination of the existing flow session in conjunction with an anchor migration will take place only after a timeout (e.g., a TCP timeout where the flow sessions are TCP connections), which typically (e.g., in the case of TCP) requires several RTTs to complete. It will be appreciated that, when the anchor migration mechanism is used, only packets in one direction (rather than both directions) are dropped (e.g., packets from the UE 150 toward the endpoint with which the UE 150 is communicating when the endpoint with which the UE 150 is communicating is selected for teardown or packets from the endpoint with which the UE 150 is communicating toward the UE when the application on the UE 150 is selected for teardown). Various other advantages associated with use of the anchor migration mechanism are contemplated.

As discussed herein, anchor migration may be used to migrate flows for various types of applications and the manner in which flow migration is performed may vary for at least some types of applications. Accordingly, various embodiments of the anchor migration mechanism may be further understood by considering migration of a flow for a specific type of application (namely, an HTTP flow). The use of HTTP and, therefore, HTTP flows, is ubiquitous. For example, common applications such as web browsing and downloading involve HTTP, most video streaming applications (progressive and adaptive) are based on HTTP, and so forth. As discussed further below, migration of an HTTP flow may include use of additional anchor mobility functions in addition to those described hereinabove for application flows in general. The additional anchor mobility functions use for migration of an HTTP flow may be configured based on various characteristics of HTTP. For example, it will be understood that the HTTP protocol, when used for various content access applications (e.g., content/object downloads, video steaming, or the like) involves a series of GET requests and associated GET responses. In general, the GET requests are sent (possibly with range queries) to request content (e.g., request downloading of files/objects, request streaming of particular videos, or the like) and associated GET responses are returned.

The CE 180, based on a determination to migrate an HTTP flow of an application from a current MGA node 120 to a new MGA node 120, may initiate a deep packet inspection (DPI) operation at an FE to trigger the FE to monitor for the next HTTP GET request from the application. The FE using DPI to monitor for the next HTTP GET request from the application, based on detection of the next HTTP GET request from the application, begins dropping packets from the application in order to prevent the HTTP GET request from reaching its intended destination. This provides an opportunity for the HTTP flow of the application to be migrated from the current MGA node 120 to the new MGA node 120, because the HTTP flow of the application may be migrated from the current MGA node 120 to the new MGA node 120 as soon as any outstanding HTTP GET requests have been satisfied. The FE then identifies the proper time at which to terminate the underlying TCP connection supporting the HTTP flow of the application (based on a determination that all of the outstanding HTTP GET requests have been satisfied). The manner in which the FE determines that all of the outstanding HTTP GET requests have been satisfied may depend on whether or not HTTP pipelining is used. When HTTP pipelining is not used (namely, HTTP GET requests are issued sequentially, with the next HTTP GET request being issued only after the HTTP GET response to the current HTTP GET request has been completely received), receipt of a new HTTP GET request indicates that all outstanding HTTP GET requests have been satisfied and, thus, that it is a good time to terminate the underlying TCP connection. Alternatively, when HTTP pipelining is used (namely, HTTP GET requests are not necessarily issued sequentially), the FE needs to identify when all of the outstanding HTTP GET requests have been satisfied (e.g., based on DPI or any other suitable mechanism) before determining that it is a good time to terminate the underlying TCP connection. The FE, after determining that all outstanding HTTP GET requests have been satisfied and, thus, that it is a good time to terminate the underlying TCP connection, initiates termination of the underlying TCP connection. The underlying TCP connection may be terminated (namely, to ensure that, upon reconnect, the new TCP connection is routed via the new MGA node 120 rather than via the previous MGA node 120) as described hereinabove for application flows in general. It is noted that, while this approach may not prevent interruption of traffic flow (since the HTTP GET request is dropped), it at least ensures that HTTP GET requests that are currently being served are able to be completed rather than being terminated. This will save wireless network resources, as compared to the case where existing HTTP flow are terminated, since partially received HTTP responses are dropped by the UE 150 and, therefore, would have to be restarted later (including retransmission of any content that had already been delivered to the UE 150).

The FE that is configured to use DPI to determine when to migrate the HTTP flow may be any FE on the flow path between the UE 150 and the HTTP server (e.g., the FE 194 of the UE 150, the FE 193 of the BTS switch 142 supporting the UE 150, the FE 192 of the communication element 132 supporting the flow, the FE 191 of the MGA node 120 supporting the flow, or any other suitable FE along the flow path). It is noted that, if the FE that is configured to use DPI to determine when to migrate the HTTP flow is the FE 194 of the UE 150, then further optimizations are possible. For example, the FE 194 of the UE 150, instead of dropping the next HTTP GET request, can initiate a new TCP connection to the HTTP server through the new MGA node 120 and forward the HTTP GET request via this new TCP connection. For example, the FE 194 of the UE 150 may initiate TCP splicing/sequence rewriting of the previous TCP connection onto the new TCP connection so that, to the application, it appears that the TCP connection continues without interruption while the data is actually being delivered via the new TCP connection. For example, the FE 194 of the UE 150, where HTTP pipelining is used, may (1) delay sending the new HTTP GET request on the new TCP connection until the data for all outstanding HTTP GET requests has been received by the application or (2) send the new HTTP GET request on the new TCP connection, buffer any received data for the new HTTP GET request on the new TCP connection until the data for all outstanding HTTP GET requests on the previous TCP connection has been received by the application, and, based on a determination that all of the outstanding HTTP GET requests on the previous TCP connection have been completed, pass the buffered data for the new HTTP GET request on the new TCP connection to the application.

The FE that is configured to use DPI to determine when to migrate the HTTP flow, as discussed above, may be any FE on the flow path between the UE 150 and the HTTP server. The configuration of the FE to use DPI, to determine when to migrate the HTTP flow, may be provided in various ways. For example, configuration of the FE to use DPI may include using a virtual switch (e.g. OVS) running on linux kernel that supports flow table entries (e.g., utilizing conntrack markings) for initiating/suspending the delivery of the packets (e.g., via efficient memory mapping) from the kernel to the user space (e.g. using NFQUEUE/libnetfilter) software for HTTP DPI analysis, thereby enabling the DPI capability to be flexibly turned on/off in the OVS so that DPI is done only for the duration of anchor migration and may be kept turned off otherwise. This can lower the performance impact of DPI, thus making for an efficient solution. It will be appreciated that configuration of the FE to use DPI, to determine when to migrate the HTTP flow, may be provided in various ways.

It will be appreciated that, although primarily presented herein with respect to embodiments associated with specific protocols operating at specific communication layers, various embodiments of the anchor migration mechanism may be adapted to support flow migrations provided using other protocols, using protocols operating at other communication layers, or the like, as well as various combinations thereof. For example, although primarily presented herein with respect to embodiments of the anchor migration mechanism in which flow migrations are performed where the underlying flow sessions are provided at a specific communication layer (namely, the transport layer) using a specific protocol (namely, TCP), various embodiments of the anchor migration mechanism may be adapted to support flow migrations where the underlying flow sessions are provided using other transport layer protocols (e.g., Stream Control Transport Protocol (SCTP) or the like) or using protocols at other communication layers (namely, a network layer protocol, a session layer protocol, or the like). For example, although primarily presented herein with respect to embodiments of the anchor migration mechanism in which flow migrations are performed where the migrated flow is a flow at a specific communication layer (namely, the application layer) using a specific protocol (namely, HTTP), various embodiments of the anchor migration mechanism may be adapted to support flow migrations where the migrated flow is for a different application or using a protocol at a different communication layer. Accordingly, a more general method flow illustrating embodiments of the anchor migration mechanism is depicted and described with respect to FIGS. 2A and 2B.

Figure 2A:
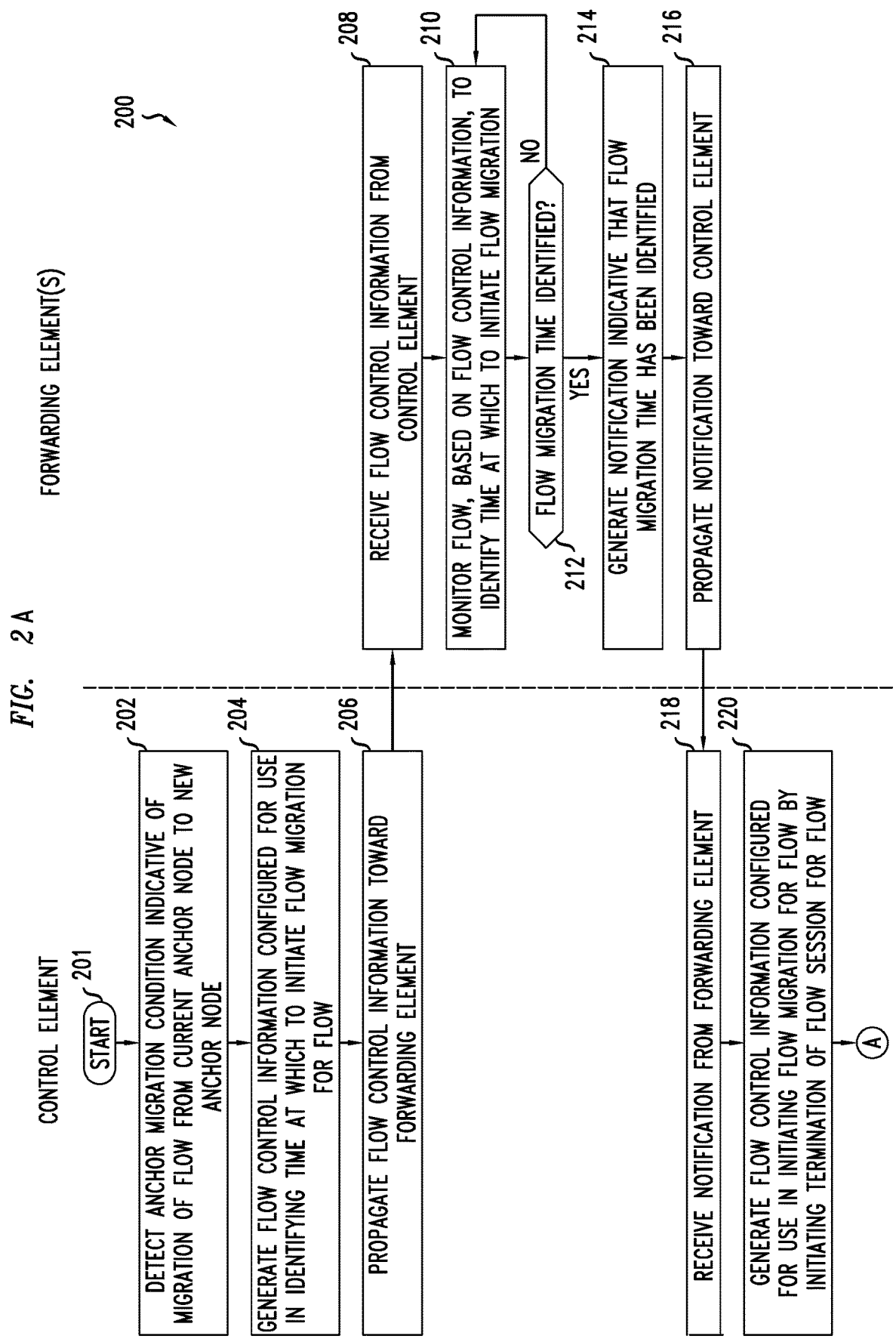

FIGS. 2A and 2B depict a flow diagram of a method for providing anchor mobility. As depicted in FIGS. 2A and 2B, a portion of the steps of method 200 are performed by a control element (e.g., CE 180 of FIG. 1) and a portion of the steps of method 200 are performed by a forwarding element(s) (e.g., one or more of the FEs of FIG. 1). It will be appreciated that, although primarily depicted and described herein as being performed serially, at least a portion of the steps of method 200 may be performed contemporaneously or in a different order than as depicted in FIGS. 2A and 2B.

At step 201, method 200 begins.

At step 202, the CE detects an anchor migration condition indicative of a migration of a flow from a current anchor node to a new anchor node. The flow may be a flow of a UE or other wireless device. The flow may be an application layer flow (e.g., HTTP, RTP, RTSP, or the like) or any other suitable type of data flow. The flow may be supported by an underlying flow session (e.g., a transport layer connection, such as TCP, or any other suitable type of underlying flow session. The condition may be a handover of the UE (or other wireless device) between wireless access nodes or other condition that may cause a migration of the UE (or other wireless device) between anchor nodes. The new anchor node may include any anchor node with which the UE is associated (e.g., such as where the set of anchor nodes available for use by the UE may be updated over time as the UE roams between access points served by different sets of anchor nodes). The new anchor node for the UE may be selected at this time or may have already been selected prior to detection of the anchor migration condition.

At step 204, the CE generates flow control information configured for use in identifying a time at which to initiate the flow migration for the flow. The time at which to initiate the flow migration for the flow may be based on one or more of a level of activity on the flow. The time at which to initiate the flow migration for the flow may be based on one or more factors specific to the application type of the flow. The flow control information may include information configured to enable the FE to monitor the flow state of the flow (e.g., to monitor for an indication of no activity on the flow or to monitor for an indication of a level of activity on the flow that is below a threshold). The flow control information may include one or more flow table entries.

At step 206, the CE propagates the flow control information toward the FE. At step 208, the FE receives the flow control information from the CE. The flow control information may be propagated from the CE to the FE using any suitable communication protocol (e.g., OpenFlow or any other suitable type of communication protocol, which may be different for different types of SDN networks).

At step 210, the FE monitors the flow, based on the flow control information, to identify a time at which to initiate the flow migration for the flow. The FE may monitor the flow, based on the flow control information, to identify an indication of no activity on the flow (e.g., based on a timeout condition specified as part of the flow control information), an indication of a level of activity on the flow that is below a threshold (e.g., based on a threshold that is specified as part of the flow control information), or the like.

At step 212, the FE determines whether the time at which to initiate the flow migration for the flow has been identified. If a determination is made that the time at which to initiate the flow migration for the flow has not been identified, method 200 returns to step 210 (i.e., the FE continues to loop within steps 210 and 212 until identifying the time at which to initiate the flow migration for the flow). If a determination is made that the time at which to initiate the flow migration for the flow has been identified, method 200 proceeds to step 214.

At step 214, the FE generates a notification indicative that the time at which to initiate the flow migration for the flow has been identified (namely, that the FE has determined that the migration of the flow is to be initiated).

At step 216, the FE propagates the notification toward the CE. At step 218, the CE receives the notification from the FE. The notification may be propagated from the CE to the FE using any suitable communication protocol (e.g., OpenFlow or any other suitable type of communication protocol).

At step 220, the CE generates flow control information configured for use in initiating flow migration of the flow by initiating termination of a flow session for the flow. The CE generates flow control information configured for use in initiating flow migration of the flow based on receipt of the notification that the FE has identified a time at which to initiate the flow migration for the flow. The CE may be configured to select the endpoint of the flow via which termination of the flow is initiated (e.g., the UE side or the device with which the UE is communicating) and to generate the flow control information based on the endpoint of the flow via which termination of the flow is initiated. The flow control information may include one or more flow table entries.

At step 222, the CE propagates the flow control information toward the FE. At step 224, the FE receives the flow control information from the CE. The flow control information may be propagated from the CE to the FE using any suitable communication protocol (e.g., OpenFlow or any other suitable type of communication protocol).

At step 226, the FE initiates flow migration for the flow based on the flow control information. The FE may initiate flow migration for the flow by initiating termination of the flow session for the flow based on the flow control information (where the FE is responsible for causing termination of the flow session for the flow under the control of the CE) or by supporting termination of the flow session for the flow based on the flow control information (where the CE is responsible for causing termination of the flow session for the flow and does so with assistance from the FE). The manner in which the termination of the flow session for the flow is performed may depend on the protocol of the flow session (e.g., sending a packet including a TCP FIN flag where the protocol is TCP, sending a packet including a TCP RESET flag where the protocol is TCP, or the like), the endpoint of the flow via which termination of the flow is initiated (e.g., the UE or the device with which the UE is communicating), or the like, as well as various combinations thereof. The manner in which the FE performs or supports termination of the flow session for the flow may depend on whether the FE controls the termination of the flow session for the flow (e.g., the FE uses the flow control information to generate TCP FIN or TCP RESET packets that are used to terminate the flow session for the flow) or whether the CE controls the termination of the flow session for the flow (e.g., the FE uses the flow control information to monitor for an event and informs the CE of the detection of the event and the CE then generates TCP FIN or TCP RESET packets that are used to terminate the flow session for the flow or configures the FE to generate TCP FIN or TCP RESET packets that are used to terminate the flow session for the flow). The FE may initiate termination of the flow session for the flow based on the flow control information based on receipt of the flow control information from the CE (e.g., the flow control information indicates to the FE that termination of the flow session for the flow is to be initiated and includes information for use by the FE in controlling termination of the flow session for the flow). The termination of the flow session for the flow may be initiated by the FE upon receipt of the flow control information from the CE or may be initiated by the FE based on detection of an event (e.g., where the flow control information also includes information for use by the FE in monitoring for the event and indicates to the FE that the FE is to initiate termination based on detection of the event. The event may include detection of receipt of a packet (e.g., a new packet for the flow, a packet of the flow that includes particular information, or the like), lack of receipt of a packet for a threshold length of time, or the like, as well as various combinations thereof. The FE may initiate termination of the flow session for the flow by providing a packet configured to cause termination of the flow session for the flow (e.g., by modifying a received packet of the flow, generating a new packet for the flow, or the like) and propagating the packet configured to cause termination of the flow session for the flow toward one of the endpoints of the flow session for the flow. The packet configured to cause termination of the flow session for the flow may be configured by setting or including one or more indicators (e.g., TCP FIN flag, TCP RESET flag, or the like). The FE may initiate termination of the flow session for the flow using various other functions.

The FE may support termination of the flow session for the flow based on the flow control information based on receipt of the flow control information from the CE (e.g., the flow control information indicates to the FE that the FE is to monitor for an event and to inform the CE when the event is detected, such that the CE may then initiate termination of the flow session for the flow). The flow control information may include one or more rules for use by the FE for monitoring for the occurrence of an event that will trigger termination of the flow session for the flow. The FE may monitor for the detection of the event based on the flow control information. The event may include detection of receipt of a packet (e.g., a new packet for the flow, a packet of the flow that includes particular information, or the like), lack of receipt of a packet for a threshold length of time, or the like, as well as various combinations thereof. The FE, upon detecting the event, may notify the CE of detection of the event. The CE, based on the notification from the FE that the FE has detected the event, may then initiate termination of the flow session of the flow. The CE may initiate termination of the flow session of the flow by providing a packet configured to cause termination of the flow session for the flow (e.g., by modifying a received packet of the flow, generating a new packet for the flow, or the like) and propagating the packet configured to cause termination of the flow session for the flow toward one of the endpoints of the flow session for the flow. The CE may initiate termination of the flow session of the flow by providing additional flow control information to the FE, based on processing of the notification from the FE that the event was detected, where the additional flow control information is configured to cause the FE to trigger termination of the flow session for the flow (e.g., the additional flow control information is configured to cause the FE to provide a packet configured to cause termination of the flow session for the flow (e.g., by modifying a received packet of the flow, generating a new packet for the flow, or the like) and to propagate the packet configured to cause termination of the flow session for the flow toward one of the endpoints of the flow session for the flow. In such embodiments, the packet configured to cause termination of the flow session for the flow may be configured by setting or including one or more indicators (e.g., TCP FIN flag, TCP RESET flag, or the like). The CE may initiate termination of the flow session for the flow using various other functions.

In other words, where termination of the flow session for the flow is based on detection of an event, the detection of the event by the FE may or may not lead to additional communication exchanges between the FE and the CE for purposes of effecting the termination of the flow session for the flow.

The termination of the flow session for the flow may be initiated or performed in various other ways.

At step 228 (which is executed after the flow session for the flow has been terminated, as indicated by the dashed line from step 226 to step 228), the FE receives a packet indicative of a request for establishment of a new flow session for the flow.

At step 230, the FE propagates an indication of the request for establishment of the new flow session for the flow toward the CE. At step 232, the CE receives the indication of the request for establishment of the new flow session for the flow from the FE. The indication of the request for establishment of the new flow session for the flow may be propagated from the FE to the CE using any suitable communication protocol (e.g., OpenFlow or any other suitable type of communication protocol).

At step 234, the CE generates flow control information for the new flow session for the flow to establish the new flow session for the flow via the new anchor node. The flow control information may include one or more flow table entries.

At step 236, the CE propagates the flow control information for the new flow session toward the FE. At step 238, the FE receives the flow control information for the new flow session from the CE. The flow control information may be propagated from the CE to the FE using any suitable communication protocol (e.g., OpenFlow or any other suitable type of communication protocol).

At step 240, the FE directs packets associated with generation of the new flow session for the flow toward the new anchor node based on the flow control information for the new flow session.

At step 299, method 200 ends.

It will be appreciated that, although omitted from FIG. 1 and FIGS. 2A and 2B for purposes of clarity, various embodiments of anchor mobility may be used to support mobility of flows between anchor nodes within various contexts (e.g., during UE handovers within the context of content access in general, during UE handovers within the context of local content access, or the like). The operation of various embodiments of the anchor mobility mechanism may be further understood by considering the use of the anchor mobility mechanism within a particular context (e.g., local content access, which is expected to be a particular relevant application for anchor mobility). For example, for an enterprise user accessing content, the enterprise user may access the content from a local cache within an enterprise location when the enterprise user is at the enterprise location and may access the same content from an enterprise content delivery network (CDN) in a remote enterprise datacenter when the enterprise user is not at the enterprise location. In at least some embodiments, anchor mobility may be used to provide a seamless handoff between content servers when the enterprise user moves relative to the enterprise location while accessing content (e.g., either handoff from the local cache to the datacenter CDN when the user moves from being inside the enterprise location to being outside the enterprise location or handoff from the datacenter CDN to the local cache to the when the user moves from being outside the enterprise location to being inside the enterprise location. The use of embodiments of the anchor mobility mechanism to support local content access may be further understood by way of reference to FIG. 3.

Figure 3:
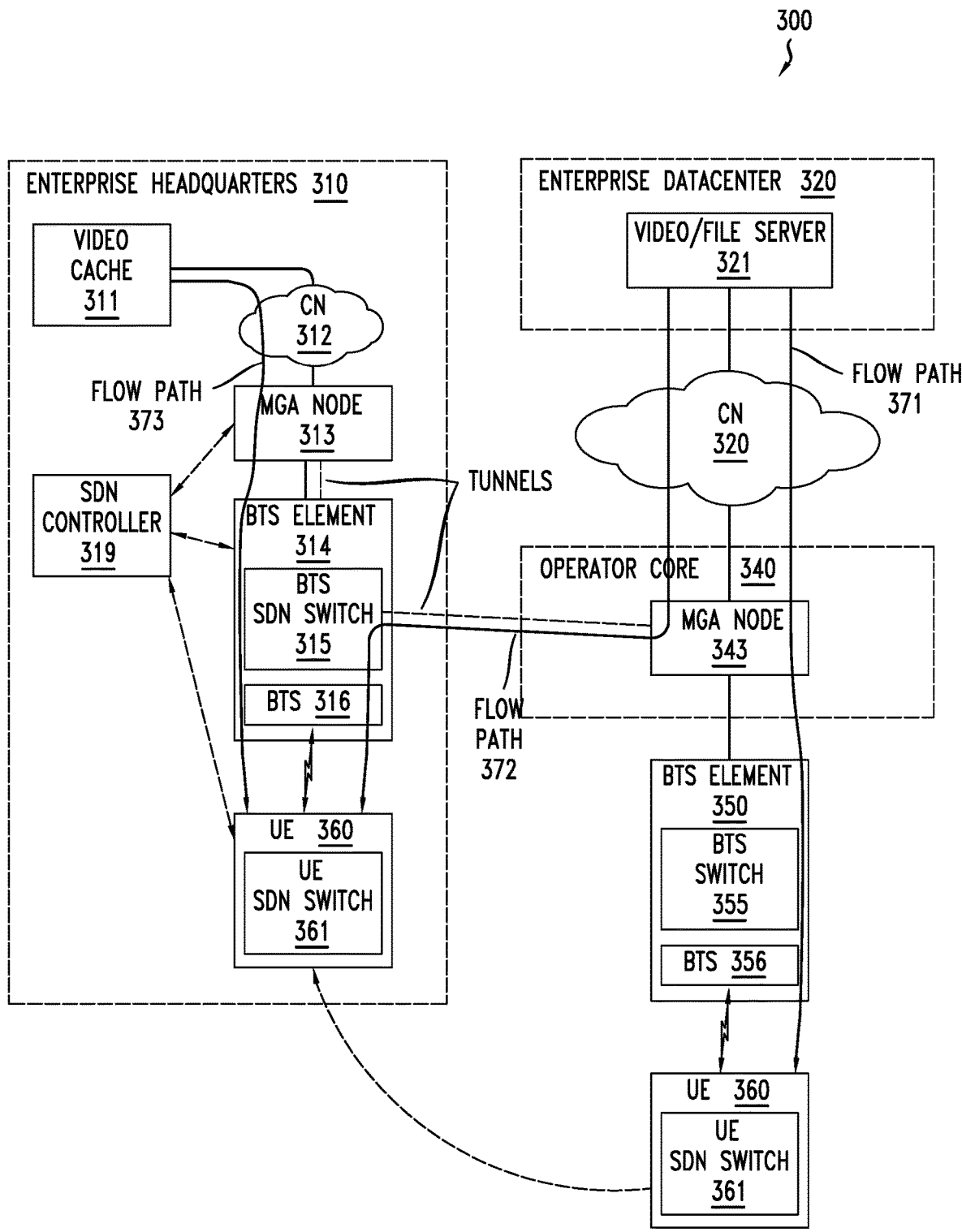
FIG. 3 depicts a system illustrating use of anchor mobility to support local content access.

FIG. 3 depicts a system illustrating use of anchor mobility to support local content access. The system 300 illustrates use of anchor mobility when a user moves from outside of an enterprise headquarters to inside of the enterprise headquarters while two flows are active for the user. The system 300 includes elements located at an enterprise headquarters 310, elements, located at an enterprise datacenter 320 that is remote from the enterprise datacenter 320, a communication network (CN) 330, an operator core 340, a BTS element 350, and a UE 360 (which includes a UE SDN switch 361). The enterprise headquarters 310 includes a video cache 311, a communication network (CN) 312, an MGA node 313, a BTS element 314 (which includes a BTS SDN switch 315 and a BTS 316), and an SDN controller 319. The CN 312 communicatively connects the video cache 311 and the MGA node 313. The MGA node 313 and the BTS element 314 are communicatively connected. The SDN controller 319 is configured to control MGA node 313, BTS SDN switch 315, and the UE SDN switch 361 (when the UE 360 is located within the enterprise headquarters 310 and being served by BTS 316 of BTS element 314. The enterprise datacenter 320 includes a video/file server 321. The operator core 340 includes an MGA node 343. The video/file server 321 and MGA node 343 are communicatively connected via CN 320. The BTS element 350 includes a BTS switch 355 and a BTS 356. The MGA node 343 and BTS element 350 are communicatively connected.

The UE 360 is initially located outside of the enterprise headquarters 310 and connected to BTS element 350 (e.g., a macro-cell of the operator). The UE 360 has an ongoing video streaming session (flow) streaming video content served by the video/file server 321 of the enterprise datacenter 320 via CN 330, operator core 340, and BTS element 350. The UE 360 also has an ongoing file download session (flow) with video/file server 321. The two sessions (or flows) are assigned to a common mobility gateway/anchor node (illustratively, MGA node 343 of the operator core 340). The UE 360 is assigned to MGA node 343 and has an IP address from the MGA node 343. The two flows follow a common flow path 371 from the enterprise datacenter 320 to UE 360 via CN 330, operator core 340, and BTS element 350.

The UE 360, while the two flows are active, moves inside of the enterprise headquarters 310 and switches over from BTS element 350 to the BTS element 314 located within the enterprise headquarters 310 (e.g., a small-cell access point). The BTS element 314 informs the SDN controller 319 of the mobility of the UE 360 to BTS element 314. The SDN controller 319 assigns the new anchor (illustratively, MGA node 313) to the UE 360, such that both of the anchors (namely, MGA node 343 and MGA node 313) are now assigned to the UE 360. The UE 360 obtains an IP address from the MGA node 313 (which may be performed using standard procedures, such as Dynamic Host Configuration Protocol (DHCP) or the like), such that the IP addresses of both of the anchors (namely, MGA node 343 and MGA node 313) are now assigned to the UE 360. At this point, the two existing flows (video and file download) continue to be served from video/file server 321 via MGA node 343 using the IP address assigned to UE 360 on MGA node 343. The two flows follow a common flow path 372 from the enterprise datacenter 320 (illustratively, from video/file server 321) to UE 360 via CN 330, MGA node 343 of operator core 340, a tunnel between MGA node 343 of operator core 330 and BTS SDN switch 315 of BTS element 314, and BTS element 314. The SDN controller 319 initiates anchor migration of the video session for the UE 360, which is discussed further below.

The SDN controller 319 is configured to control anchor migration for UE 360. The SDN controller 319 is configured with a policy to take advantage of the local caching of the video content within video cache 311. The SDN controller 319, based on detection of the mobility of the UE 360 into the enterprise headquarters 310, configures one of the SDN switches (e.g., BTS SDN switch 315 or UE SDN switch 361) to monitor for a lull in activity of the video session (e.g., by provisioning with the SDN switch a flow entry for the video session that is configured to report flow entry timeout for the video session to the SDN controller 319). The SDN controller 319, upon receiving a notification that flow entry timeout for the video session has occurred, initiates configuration of the UE SDN switch 361 to use MGA node 313, rather than MGA node 343, for the video session. As a result, the video session is routed via MGA node 313, thus, follows a new flow path 373 from the video cache 311 to UE 360 via CN 312, MGA node 313, and BTS element 314. It is noted that the file download flow continues to follow the flow path 372.

Referring back to FIG. 1, it is noted that, in at least some embodiments, anchor mobility may be simplified by using Layer 2 (L2) tagging (e.g. using Virtual Local Area Network (VLAN) tags or other suitable L2 tags) of the tunnels between the BTS switches 142 and the MGA nodes 120. The MGA nodes 120 are assigned unique tags, respectively, and all tunnels for a particular MGA node 120 (from any BTS switch 142) represent the tag for that MGA node 120. For a UE 150 that is connected to an MGA node 120 (e.g., the UE 150 has obtained an IP address from the MGA node 120), the tag of the MGA node 12 to which the UE 150 is connected is provided to the UE 150 for use in handling communication of packets. On the uplink from the UE 150, for a flow that is forwarded via the MGA node 120, the UE 150 adds (e.g., appends) the tag of the MGA node 120 to each uplink packet (e.g., this tagging may be performed by the FE 194 of the UE 150) such that the BTS switch 142 of the BTS element 140 that receives the uplink packets can use the tag to identify the MGA node 120 for the flow and, thus, identify the tunnel from the BTS switch 142 via which the packets of the flow are to be sent in order to reach the MGA node 120 to which the UE 150 is connected for that flow. On the downlink toward the UE 150, (1) the MGA node 120 (e.g., the FE 191 on the MGA node 120) sends the downlink packets via the appropriate tunnel, based on a flow table entry that maps the IP address of the UE 150 to the tunnel endpoint for the tunnel, such that the downlink packets reach the BTS element 140 to which the UE 150 is connected and (2) the BTS element 140 (e.g., the BTS switch 142) receives the downlink packets from the MGA node 120 via the tunnel, assigns the tag of the MGA node 120 to the downlink packets based on the tunnel via which the downlink packets are received, uniquely identifies the UE 150 to which the downlink packets are to be sent based on a combination of the tag and the destination IP address of the downlink packets (which is set to the IP address assigned to the UE 150 by that MGA node 120, which may be one of multiple IP addresses assigned to the UE 150 in general), and sends the downlink packets toward the UE 150. It is noted that, with use of tagging as described above, even if the MGA nodes 120 had overlapping IP address spaces, use of the tags would disambiguate the IP address spaces such that there still would not be any conflicts. It is noted that, with use of tagging as described above, the tunnels between the BTS switches 142 and the MGA nodes 120 can be statically provisioned. For example, at least some of the tunnels may be provisioned in advance, while other tunnels may be provisioned based on a determination that there is at least one UE 150 at the BTS 144 that is using a given MGA node 120. It is noted that, with use of tagging as described above, the need for use of per UE/flow tunnels may be eliminated. It is noted that, with use of tagging as described above, when a UE 150 is handed off from a current BTS 144 to a new BTS 144, only the flow table entries in the MGA nodes 120 to which the UE 150 is connected need to be updated for the UE 150 (namely, to change the tunnel endpoints to the new BTS switch 142 while no changes are required in the flow table entries of the BTS switches 142 since the uplink packets of the UE 150 are forwarded by the BTS switches 142 based on the tags of the MGA nodes 120. It is noted that, as discussed above, use of tagging as described above may simplify anchor mobility. The use of tagging within the context of anchor mobility may be further understood by way of reference to FIG. 4, which depicts a call flow for anchor mobility where tagging is used.

Figure 4:
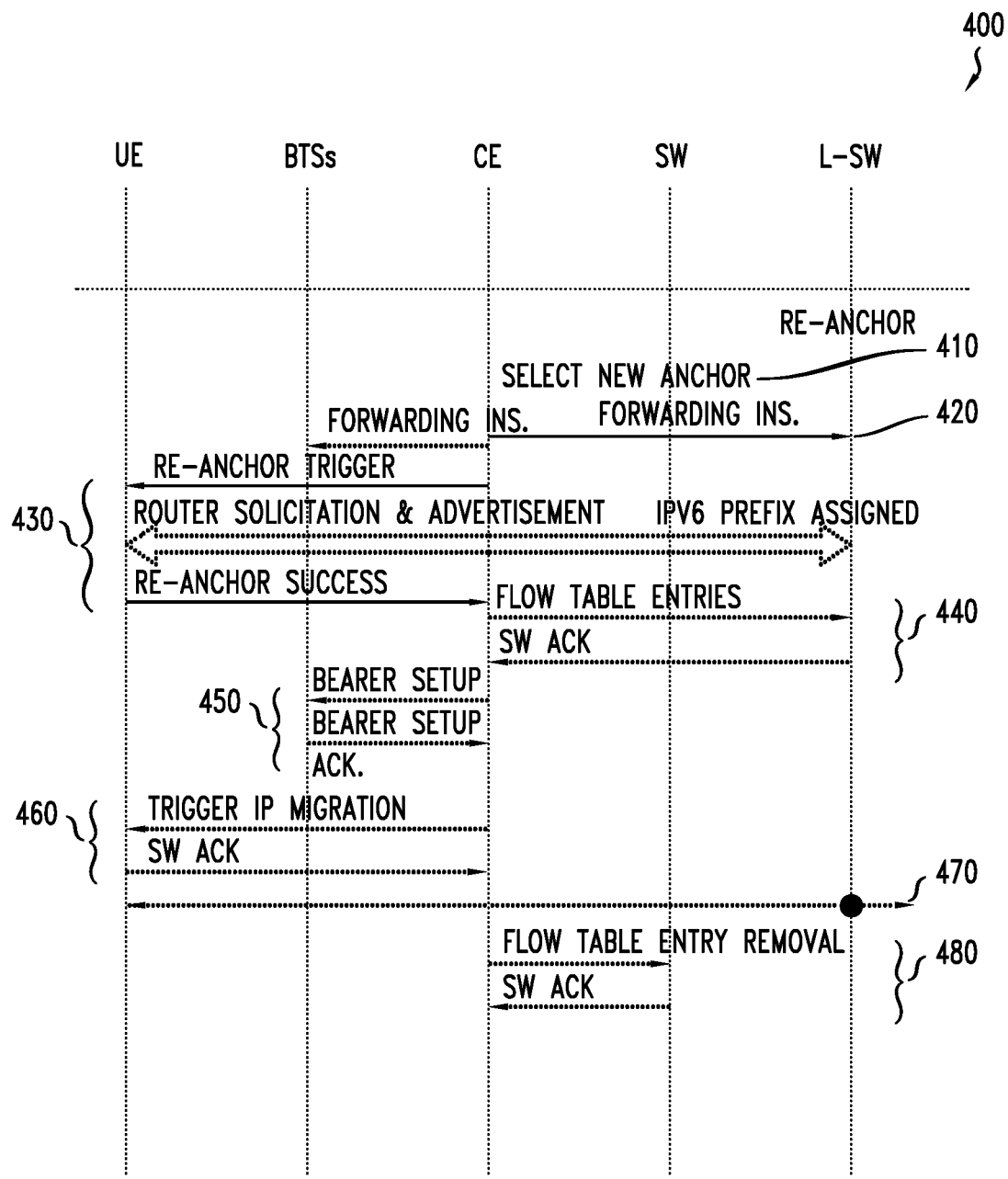
FIG. 4 depicts a call flow illustrating use of tagging to support anchor mobility.

FIG. 4 depicts a call flow illustrating use of tagging to support anchor mobility. As depicted in FIG. 4, the call flow 400 includes various functions performed by a control element (CE) 401, BTSs 402 (including BTS switches), a UE 403, an existing anchor node (including a switch (SW)) 404, and a local anchor node (including a local switch (L-SW)) 405. The call flow 400 is for an embodiment in which the L2 tags are VLAN-based and the L2 tunnels are Virtual Extensible LAN (VXLAN)-based. At step 410, CE 401 selects a new anchor node (illustratively, local anchor node 405) based on a location of UE 403. At step 420, CE 401 establishes the L2 tunnels by providing L2 tunnel information to the BTS switches of BTSs 402 and to the L-SW of local anchor node 405. At step 430, CE 401 initiates a migration of the UE 403 from the existing anchor node 404 to local anchor node 405 (also referred to within the context of FIG. 4 as a re-anchor). The CE 401 sends a migration (re-anchor) trigger to UE 401, which triggers UE 403 to obtain a new IP address from local anchor node 405 (illustratively, via router solicitation and advertisement). The interaction between the UE 403 and the local anchor node 405 results in assignment of an IP address to the UE 403 by the local anchor node 405. The UE 403 notifies CE 401 that re-anchoring by UE 403 (namely, from existing anchor node 404 to local anchor node 405) has been completed successfully. At step 440, the CE 401 configures the L-SW of the local anchor node 405 to map the IP address of the UE 403 that was assigned to the UE 403 for local anchor node 405 to the VXLAN Tunnel Identifier for downlink packets to be tunneled from local anchor node 405 toward UE 403 for delivery to UE 403 on the downlink. At step 450 (an optional step which may not be performed under at least some conditions), CE 401 may control RAN bearer setup with the BTSs 402. At step 460, the CE 401 initiates migration of the flows from the existing anchor node 405 to the new anchor node. The CE 401 sends a flow migration trigger message to the UE 403 and the UE 403 responds with an acknowledgment. At step 470, the migrated flows of the UE 403 are then transported via new anchor node 405. At step 480 (an optional step), CE 401 may control removal of flow table entries at the existing anchor node 404 (although, in at least some instances, flow table entries at the at the existing anchor node 404, even if they have timed out, may not be removed in order to prevent errant packets). It is noted that method 400 of FIG. 4 may be further understood when considered in conjunction with FIG. 1 and FIGS. 2A and 2B.

It will be appreciated that, although primarily depicted and described herein with respect to embodiments in which separation of the control and data planes within the 5G wireless network is provided using SDN, in at least some embodiments the separation of the control and data planes within the 5G wireless network may be provided using other control and data plane separation capabilities.

It will be appreciated that, although primarily depicted and described herein with respect to embodiments in which anchor mobility is provided within a specific type of wireless network (namely, a 5G wireless network), various embodiments of anchor mobility depicted and described herein may be adapted for use within various other types of wireless networks (e.g., 4G wireless networks, wireless networks which follow 5G wireless networks, or the like).

Figure 5:
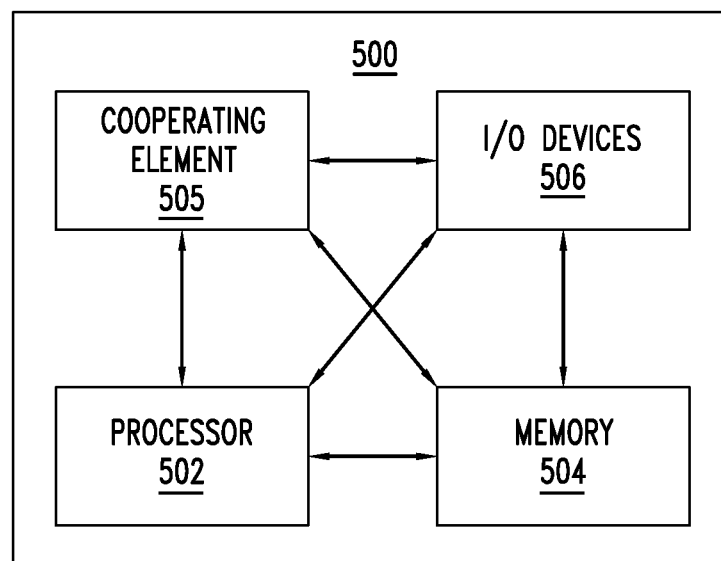
FIG. 5 depicts a high-level block diagram of a computer suitable for use in performing various functions described herein.

FIG. 5 depicts a high-level block diagram of a computer suitable for use in performing various functions described herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing one or more of NC 110, an MGA node 120, a communication element 132, a BTS element 140, a BTS switch 142, a BTS 144, a UE 150, a CE 180, an FE (e.g., an FE 191, an FE 192, an FE 193, an FE 194), or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that performs various method steps, as circuitry that cooperates with the processor to perform various method steps, or the like, as well as various combinations thereof. Portions of the functions/elements described herein may be implemented as a computer program product storing computer instructions which, when processed by a computer, adapt the operation of the computer such that methods steps and/or techniques described herein are invoked or otherwise provided. Instructions for invoking various methods may be stored in fixed or removable media (e.g., non-transitory computer-readable media), transmitted via a data stream in a broadcast or other signal bearing medium, stored within a memory of a computing device operating according to the instructions, or the like, as well as various combinations thereof. It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including program code;
   wherein the at least one memory and the program code are configured to, with the at least one processor, cause a control element to at least:
   detect an anchor migration condition indicative that an application layer flow of an application is to be migrated from a first anchor node to a second anchor node, wherein the application layer flow is between a pair of endpoints including a wireless endpoint and a second endpoint, wherein the application layer flow is supported by a transport layer session between the endpoints;
   send, toward a forwarding element on a data path of the application layer flow based on the anchor migration condition, flow control information configured to cause the forwarding element to monitor the application layer flow for identifying a time at which to initiate migration of the application layer flow;
   receive, from the forwarding element based on monitoring of the application layer flow by the forwarding element, an indication that the time at which to initiate migration of the application layer flow has been identified; and
   send, based on the indication that the time at which to initiate migration of the application layer flow has been identified, information configured to cause termination of the transport layer session supporting the application layer flow based on sending of a session termination notification for the transport layer session to one of the endpoints on behalf of the application.

2. The apparatus of claim 1, wherein the transport layer session comprises a Transmission Control Protocol (TCP) connection.

3. A method, comprising:
   detecting, by a control element, an anchor migration condition indicative that an application layer flow of an application is to be migrated from a first anchor node to a second anchor node, wherein the application layer flow is between a pair of endpoints including a wireless endpoint and a second endpoint, wherein the application layer flow is supported by a transport layer session between the endpoints;
   sending, from the control element toward a forwarding element on a data path of the application layer flow based on the anchor migration condition, flow control information configured to cause the forwarding element to monitor the application layer flow for identifying a time at which to initiate migration of the application layer flow;
   receiving, at the control element from the forwarding element based on monitoring of the application layer flow by the forwarding element, an indication that the time at which to initiate migration of the application layer flow has been identified; and
   sending, from the control element based on the indication that the time at which to initiate migration of the application layer flow has been identified, information configured to cause termination of the transport layer session supporting the application layer flow based on sending of a session termination notification for the transport layer session to one of the endpoints on behalf of the application.

4. An apparatus, comprising:
   at least one processor; and
   at least one memory including program code;
   wherein the at least one memory and the program code are configured to, with the at least one processor, cause a forwarding element to at least:
   receive, from a control element, flow control information configured to cause the forwarding element to monitor an application layer flow of an application for identifying a time at which to initiate migration of the application layer flow from a first anchor node to a second anchor node, wherein the application layer flow is between a pair of endpoints including a wireless endpoint and a second endpoint, wherein the application layer flow is supported by a transport layer session between the endpoints;
   monitor, based on the flow control information, the application layer flow to identify the time at which to initiate migration of the application layer flow;
   send, toward the control element, an indication that the time at which to initiate migration of the application layer flow has been identified; and
   receive, from the control element, information configured to cause the forwarding element to initiate termination of the transport layer session supporting the application layer flow based on sending of a session termination notification for the transport layer session to one of the endpoints on behalf of the application.

5. A method, comprising:
   receiving, by a forwarding element from a control element flow control information configured to cause the forwarding element to monitor an application layer flow of an application for identifying a time at which to initiate migration of the application layer flow from a first anchor node to a second anchor node, wherein the application layer flow is between a pair of endpoints including a wireless endpoint and a second endpoint, wherein the application layer flow is supported by a transport layer session between the endpoints;
   monitoring, by the forwarding element based on the flow control information, the application layer flow to identify the time at which to initiate migration of the application layer flow;

sending, from the forwarding element toward the control element, an indication that the time at which to initiate migration of the application layer flow has been identified; and receiving, by the forwarding element from the control element, information configured to cause the forwarding element to initiate termination of the transport layer session supporting the application layer flow based on sending of a session termination notification for the transport layer session to one of the endpoints on behalf of the application.

6. The apparatus of claim 1, wherein the information configured to cause termination of the transport layer session supporting the application layer flow comprises the session termination notification for the transport layer session.

7. The apparatus of claim 6, wherein the information configured to cause termination of the transport layer session supporting the application layer flow is sent toward the wireless endpoint or the second endpoint.

8. The apparatus of claim 6, wherein the information configured to cause termination of the transport layer session supporting the application layer flow is sent toward the wireless endpoint, wherein the session termination notification for the transport layer session is configured to appear as if it originated from the second endpoint.

9. The apparatus of claim 6, wherein the information configured to cause termination of the transport layer session supporting the application layer flow is sent toward the second endpoint, wherein the session termination notification for the transport layer session is configured to appear as if it originated from the wireless endpoint.

10. The apparatus of claim 6, wherein the session termination notification for the transport layer session is generated by the control element on behalf of one of the endpoints of the application layer flow.

11. The apparatus of claim 6, wherein the session termination notification for the transport layer session is a modified version of a flow session packet of the transport layer session that is received by the control element and intended for one of the endpoints of the application layer flow, wherein the session termination notification for the transport layer session is sent toward the one of the endpoints of the application layer flow.

12. The apparatus of claim 6, wherein the session termination notification for the transport layer session comprises a session termination packet of a transport layer protocol of the transport layer session supporting the application layer flow.

13. The apparatus of claim 1, wherein the information configured to cause termination of the transport layer session supporting the application layer flow is sent toward an element on the data path and comprises information configured to cause the element on the data path to initiate termination of the transport layer session supporting the application layer flow.

14. The apparatus of claim 13, wherein the information configured to cause the element on the data path to initiate termination of the transport layer session supporting the application layer flow is configured to cause the element to send the session termination notification for the transport layer session.

15. The apparatus of claim 13, wherein the information configured to cause the element on the data path to initiate termination of the transport layer session supporting the application layer flow is configured to cause the element to send, to one of the endpoints of the application layer flow, information configured to cause the one of the endpoints of the application layer flow to send the session termination notification for the transport layer session.

16. The apparatus of claim 1, wherein the information configured to cause termination of the transport layer session supporting the application layer flow is sent toward one of the endpoints of the application layer flow and comprises information configured to cause the one of the endpoints of the application layer flow to send the session termination notification for the transport layer session.

17. The apparatus of claim 4, wherein the transport layer session comprises a Transmission Control Protocol (TCP) connection.

18. The apparatus of claim 4, wherein the information configured to cause the forwarding element to initiate termination of the transport layer session supporting the application layer flow is configured to cause the forwarding element to send the session termination notification for the transport layer session.

19. The apparatus of claim 18, wherein the session termination notification for the transport layer session is sent toward the wireless endpoint, wherein the session termination notification for the transport layer session is configured to appear as if it originated from the second endpoint.

20. The apparatus of claim 18, wherein the session termination notification for the transport layer session is sent toward the second endpoint, wherein the session termination notification for the transport layer session is configured to appear as if it originated from the wireless endpoint.

21. The apparatus of claim 18, wherein the information configured to cause the forwarding element to initiate termination of the transport layer session supporting the application layer flow includes the session termination notification for the transport layer session.

22. The apparatus of claim 18, wherein the information configured to cause the forwarding element to initiate termination of the transport layer session supporting the application layer flow includes information configured to cause the forwarding element to generate the session termination notification for the transport layer session.

23. The apparatus of claim 18, wherein the information configured to cause the forwarding element to initiate termination of the transport layer session supporting the application layer flow includes information configured to cause the forwarding element to receive a flow session packet of the transport layer session from a first one of the endpoints of the application layer flow, modify the flow session packet of the transport layer session to form the session termination notification for the transport layer session, and send the session termination notification for the transport layer session toward a second one of the endpoints of the application layer flow.

24. The apparatus of claim 18, wherein the session termination notification for the transport layer session comprises a session termination packet of a transport layer protocol of the transport layer session supporting the application layer flow.

25. The apparatus of claim 4, wherein the information configured to cause the forwarding element to initiate termination of the transport layer session supporting the application layer flow is configured to cause the forwarding element to send, toward one of the endpoints of the application layer flow, a message configured to cause the one of the endpoints of the application layer flow to send the session termination notification for the transport layer session.

* * * * *